Jan. 15, 1952 W. E. CARROLL 2,582,679
GAUGE HOLDER
Filed Dec. 21, 1945
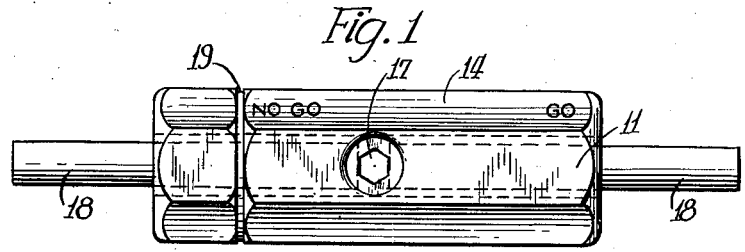
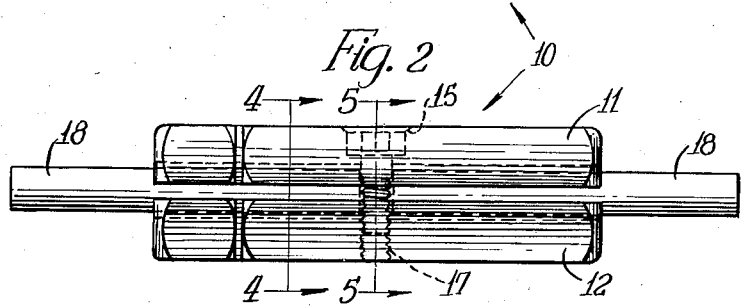
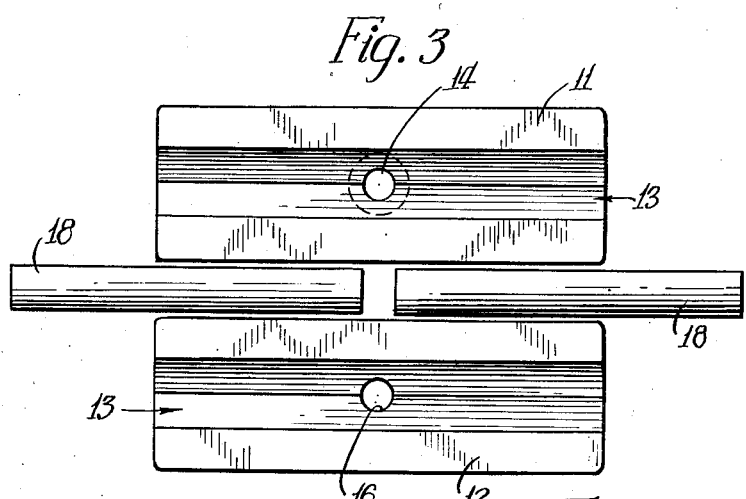
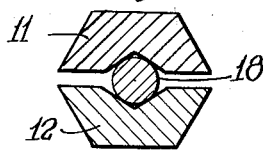
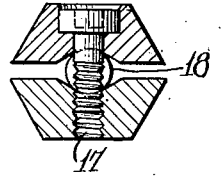
INVENTOR.
BY Wallace E. Carroll
Cromwell, Greist & Warden
ATTORNEYS Patented Jan. 15, 1952

2,582,679

UNITED STATES PATENT OFFICE 2,582,679

GAUGE HOLDER

Wallace E. Carroll, Chicago, Ill.

Application December 21, 1945, Serial No. 636,380

1 Claim. (Cl. 33—178)

The present invention relates to gauges. More particularly, it pertains to a novel type of gauge holder for accommodating a wide range of reversible gauging members in each end thereof.

Conventional gauge holders adapted to carry reversible gauging members in each end usually consist of a single piece of stock in which it is necessary accurately to drill a longitudinal hole to provide a tubular construction in order to accommodate separately mounted collets in each end thereof. These collets are usually tapered so that they can be driven into the tubular construction. They have to be slotted in order to permit them to collapse so as to grip a certain size of gauging member. The collets must also be accurately drilled in order to receive the gauging members and no appreciable range of sizes can be accommodated by such collets.

In other devices, for example, where the collets are integral with the handle member it is necessary to slot the collets, provide screw caps therefor and also to perform other reaming and threading operations.

It would be a distinct advantage to eliminate expensive drilling, reaming and slotting operations as well as to eliminate the provision of additional collets, screw caps, and the like, and this is accomplished by means of the present invention.

Generally, it is an object of the invention to provide a gauge holder which is simple yet sturdy and durable of construction, economic of manufacture and which, with a lesser number of parts than conventional holders, will perform the same as well as additional functions.

A principal object of the invention is to provide a gauge holder constituting a split tubular construction which is adapted to accommodate a wide range of gauging members of different sizes.

More specifically, it is an object of the invention to provide a gauge device comprising separable gripping members, each of which has a longitudinal groove therein, the grooved portions of the members being disposed in face-to-face relation to provide a tubular construction with gauging members located in each end thereof, and means centrally connecting the gripping members and firmly gripping and holding the gauging members in fixed position.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claim.

For a fuller understanding of the nature and objects of the invention reference should be had to the following detailed description taken in connection with the accompanying drawing, in which:

Fig. 1 is a plan view of a plug gauge illustrating a preferred embodiment of the invention;

Fig. 2 is a similar view illustrating the device in a quarter turn position;

Fig. 3 illustrates the device with the gripping members and the gauging members disassembled;

Fig. 4 is a section taken along the lines 4—4 of Fig. 2 and looking in the direction of the arrows; and Fig. 5 is another section taken along the lines 5—5 of Fig. 2 and looking in the direction of the arrows.

Referring more particularly to the drawing, there is shown a gauge holder indicated generally at 10. This holder consists of two separable gripping members 11 and 12. Each gripping member has a longitudinal groove therein indicated generally at 13 and, preferably, this groove is angular in cross section.

One of the gripping members 11 has a hole 14 drilled therethrough and is countersunk as at 15. The other gripping member 12 is drilled and tapped as at 16. An Allen type of set screw 17 is mounted to pass through the opening 14, the threaded portion thereof being adapted to engage the tapped portion 16 of the gripping member 12. This is a preferred type of means for holding the two gripping members together so that they will firmly grip and hold in fixed position gauging members of the type, for example, as that shown at 18. In having the securing means centrally located as illustrated there is also provided a stop for the opposed ends of the gauging members so that they cannot further enter the holder beyond that point.

It will be seen that there is provided a tubular construction when the two sections 11 and 12 are brought into opposed position with the longitudinally grooved portions in face-to-face relationship.

The gripping members need not always be completely disassembled as shown in Fig. 3 where they are depicted in this manner for purposes of illustration merely. It is only necessary slightly to loosen the screw 17 in order to separate the gripping members. The gauging members readily can be slipped into or out of position and a slight tightening of the screw will firmly hold them fixed between the gripping members.

The holder may be provided with an annular groove 19 to distinguish the "No Go" end from the "Go" end of the holder. Any other suitable legends or indicators may be used for this purpose.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent, is:

A plug gauge holder adapted to grip and hold cylindrical plug gauges of different diameters at opposite ends thereof, said holder consisting of two similar half regular polygonal prisms, each having angular axial grooves disposed in face-to-face relation, said prisms being held in spaced relation when said gauges are inserted therebetween, means intermediate the ends of said prisms adapted to draw the same toward each other and in a manner such that the sides of said grooves will tangentially engage the circumferential surfaces of said gauges, whereby the latter will firmly be held in position against axial or rotatable movement.

WALLACE E. CARROLL.

REFERENCES CITED

The following references are of record in the file of this patent:

UNITED STATES PATENTS

| Number | Name | Date |
|---|---|---|
| 54,212 | Ruggles | Apr. 24, 1866 |
| 467,046 | Myers | Jan. 12, 1892 |
| 1,217,465 | Lewis | Feb. 27, 1917 |
| 1,296,416 | Maddox | Mar. 4, 1919 |
| 1,646,255 | Muehleman | Oct. 18, 1927 |
| 1,677,376 | Zilliox | July 17, 1928 |
| 1,851,426 | Haskell | Mar. 29, 1932 |
| 2,102,839 | Dohrman | Dec. 21, 1937 |
| 2,345,749 | Hohwart | Apr. 4, 1944 |
| 2,345,750 | Hohwart | Apr. 4, 1944 |
| 2,375,945 | Redmer | May 15, 1945 |

FOREIGN PATENTS

| Number | Country | Date |
|---|---|---|
| 8,778 | Germany | Aug. 11, 1902 |
| 207,872 | Switzerland | Mar. 1, 1940 |
| 551,894 | Germany | June 6, 1932 |